A. D. BRANHAM.
INDICATOR.
APPLICATION FILED DEC. 10, 1909.
1,035,413.
Patented Aug. 13, 1912.
2 SHEETS—SHEET 1.
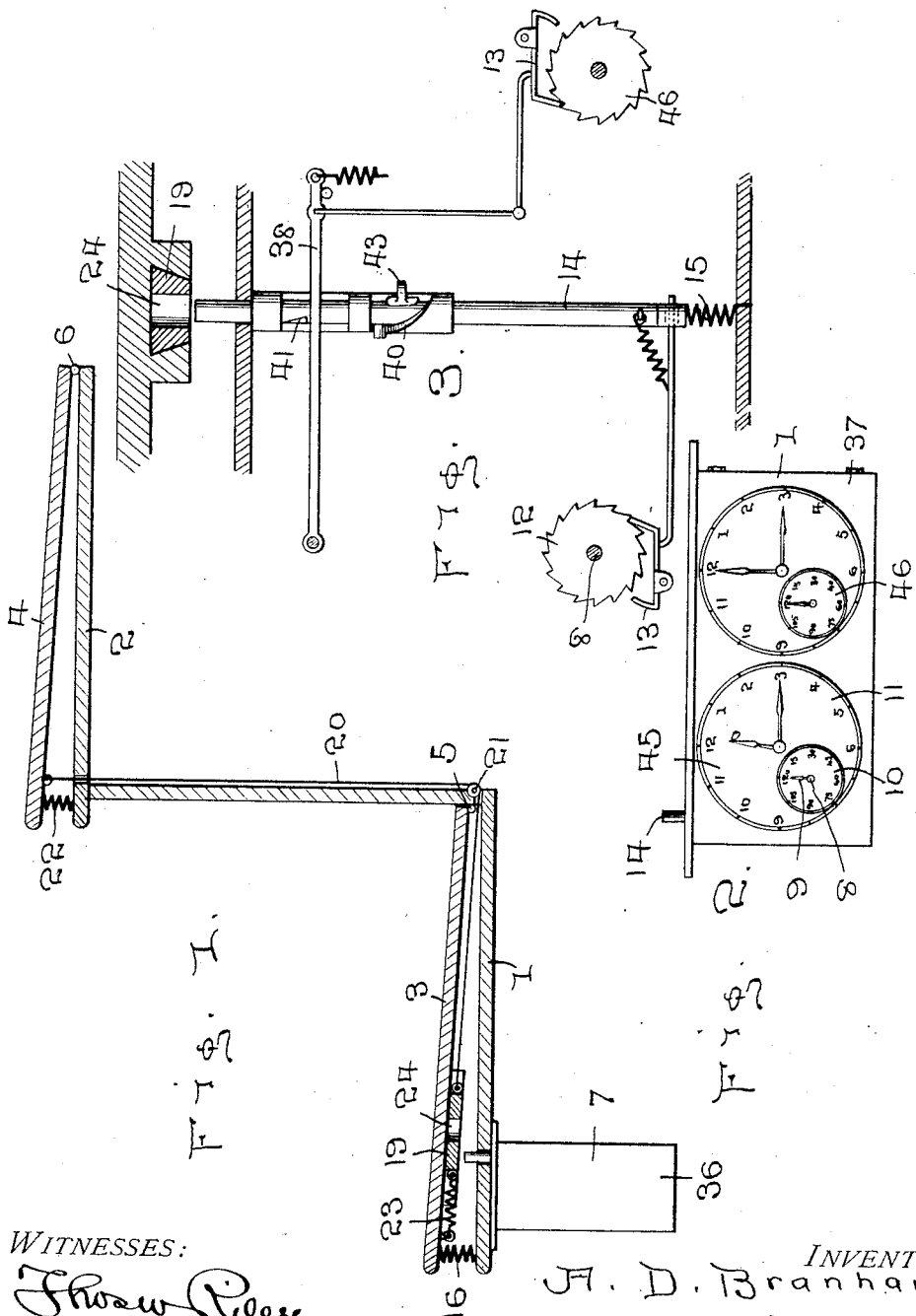
WITNESSES:
INVENTOR
A. D. Branham
BY
W. J. FitzGerald
Attorneys

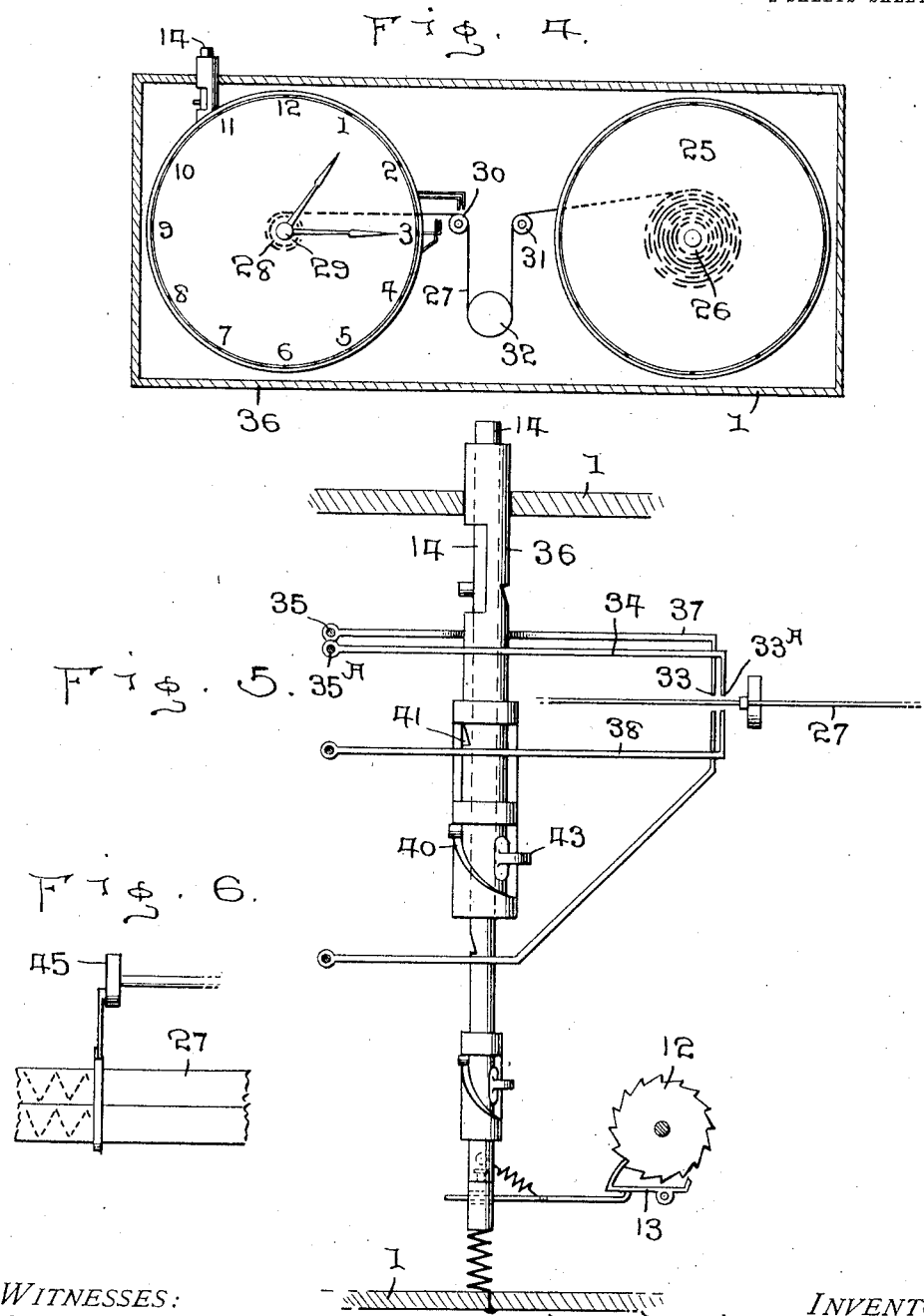

UNITED STATES PATENT OFFICE.

ADOLPHUS D. BRANHAM, OF ST. LOUIS, MISSOURI.

INDICATOR.

1,035,413.  Specification of Letters Patent.  Patented Aug. 13, 1912.

Application filed December 10, 1909. Serial No. 532,343.

*To all whom it may concern:*

Be it known that I, ADOLPHUS D. BRANHAM, a citizen of the United States, residing at St. Louis, in the State of Missouri, have invented certain new and useful Improvements in Indicators; and I do hereby declare the following to be a full, clear, and exact description of the invention, such as will enable others skilled in the art to which it appertains to make and use the same.

My invention relates to new and useful improvements in indicators, and more particularly, to that class adapted to be used for indicating the number of passengers entering a vehicle.

My object is to provide means for operating an indicator upon the entrance of the passengers into the vehicle.

My further object is to provide means for operating an indicator upon the entrance of the passengers into the vehicle, and operate a register upon the egress of the passengers from the vehicle.

A further object is to provide means to mount a strip of tape in position to be wound from one part of the device to another.

A further object is to provide means for placing an imprint or character upon the tape upon the entrance of children passengers into the vehicle, an imprint or character upon the tape upon the entrance of adult passengers into the vehicle, an imprint or character upon the tape upon the egress of adult passengers from the vehicle and an imprint or character upon the tape upon the egress of children passengers from the vehicle, and, a further object is to provide a means for preventing the operation of the indicating mechanism when the passengers alight from the vehicle, and, a still further object is to provide means for preventing the operation of the registering mechanism upon the entrance of adult passengers, upon the egress of adult passengers and upon the egress of children passengers; upon the entrance of a child passenger into the coach, and, further, to prevent the operation of the registering mechanism upon the entrance of a child passenger into the coach, and upon the egress of a child passenger from the coach, and upon the egress of an adult passenger from the coach; upon the entrance of an adult passenger into the coach. To prevent the operation of the registering mechanism upon the ingress of a child passenger into the coach, upon the ingress of an adult passenger into the coach, and upon the egress of an adult passenger from the coach; upon the egress of a child passenger from the vehicle, and further to prevent the operation of the registering mechanism upon the egress of a child passenger from the coach, and upon the ingress of a child passenger into the coach, and upon the ingress of an adult passenger into the coach; upon the egress of an adult passenger from the coach.

Other objects and advantages will be hereinafter referred to, and more particularly pointed out in the claims.

In the accompanying drawings forming part of this application, Figure 1 is a detail sectional view of the steps of a vehicle, showing my improved registering mechanism applied thereto. Fig. 2 is a front elevation of the register removed from the steps. Fig. 3 is an enlarged detail sectional view, showing the manner of operating the registering mechanism. Fig. 4 is a sectional view, showing a duplicate registering mechanism. Fig. 5 is an enlarged detail view, partly in section, of the operating mechanism of the indicator shown in Fig. 4, and; Fig. 6 is a detail view of a shifting mechanism for the registering tape.

Referring to the drawing in which similar reference numerals designate corresponding parts throughout the several views, 1 and 2 indicate steps such as are used upon street cars, railway coaches and similar vehicles, and above the steps are hingedly secured plates 3 and 4, respectively, the hinges 5 and 6 being located at the inner edges of said plates.

In order to register the number of passengers entering the vehicle, a register 7 is positioned below the step 1 and adjacent to the outer edge thereof, said register comprising a shaft 8, to one end of which is secured a hand 9, which is adapted to travel over a graduated disk 10, the front face of the register having a covering of glass 11 or other transparent material.

Fixed to the shaft and in the rear of the dial 10, is a ratchet wheel 12, which is adapted to move the hand over the face of the dial, the teeth on said ratchet wheel being engaged by pawl 13, which pawl is pivotally attached to a plunger 14, and is normally held in engagement with the ratchet wheel through the medium of a spring 15, the upper end of which spring is attached to the plunger, while the lower end thereof directs downward pressure against the pawl.

The plunger 14 extends upwardly through the step 1, the upper end of the plunger extending a short distance above the upper surface of said step, whereby when the weight of an adult passenger is placed upon plate 3, it is depressed, the plunger will be moved downwardly to a pre-determined depth, and revolves a slight distance through medium of a plate screw 40, and is held through medium of a ring 43 until notch 41 in plunger returns to an upward position, above rod 38, therefore preventing the operation of the indicator 46 upon the entrance of an adult passenger into the coach. Upon the entrance of a child passenger into the coach, the weight is placed upon plate 3, which depresses plunger 14 downwardly a slight depth through medium of spring 16, not enough to operate ratchet wheel 12, on indicator 45, which prevents the operation of indicator 45, and operates indicator 46 upon the ingress of a child passenger, through medium of rod 38, which is brought to an upward position by means of a notch 41 in plunger, when said plunger is depressed a short distance as will be the case upon the entrance of a child passenger into the coach, the free edge of plate 3 being normally held in an elevated position by means of a spring 16, while the plunger 14 returns to its normal upward position by means of a spring 17, which spring is preferably seated in the opening 18 in the upper face of the step, to which the plunger extends.

In order to prevent the operation of the register as the passenger is leaving the vehicle, a block 19 is slidably mounted on plate 3 and immediately over the upper end of the plunger 14, said plunger normally resting thereagainst, the block being connected to the plate 4 by means of a cable 20, which cable extends around a sheave 21 adjacent to the rear edge of the step 1 extending upwardly to an opening in the step 2, where it is engaged with the under surface of plate 4. The length of the cable 20 is such that when the forward edge of the plate 4 is elevated through the medium of spring 22, the block 19 will be moved rearwardly so that the end of plunger 14 will engage the block adjacent its forward edge, but when the plate 4 is depressed, the block 19 is moved forwardly through the medium of a spring 23, one end of which is secured to the plate 3 and the opposite end to the forward end of the block and as said block moves forwardly, the end of the plunger 14 will enter an opening 24 in the block so that when the plate 3 is depressed, the plunger will remain stationary, the thickness of the block being equal to the height of the plunger above the step. By this construction it will be readily seen that as the passenger when alighting from the vehicle always steps upon the plate 4 previous to placing his weight upon the plate 3, the block 19 will be permitted to move forwardly in view of a slackening of the cable, thus disposing the opening 24 immediately over the plunger 14 so that when the weight of the passenger is placed upon the plate 3, said plate will descend without operating the plunger 14. When plunger 14 is moved downwardly to its full moving space as is the case upon the entrance of an adult passenger into the coach it revolves through the medium plate screw 40 and is held in its turned position by the means of a spring 43, until it returns upwardly with notch 41 above rod 38, which prevents the operation of the stencil when plunger 36 is moved downwardly its full moving space. This construction is adapted primarily to be used in connection with vehicles in which but one fare is to be paid, but when passengers are carried a distance in which more than one fare is to be paid, it is my purpose to provide means for recording the time at which the register is operated. To this end, therefore, I provide any suitable form of clock mechanism 25 to which is attached a spool or bobbin 26 and on said spool is adapted to be wound a tape or paper band 27, said tape being wound thereon co-incident to the travel of the hands of the clock.

The tape before being wound upon the spool 26 is wound upon the drum 28, which drum is placed upon a supporting shaft 29 so that said drum will readily rotate with the winding of the tape upon the spool, the movement of said tape upon the drum to the spool being controlled by passing the same over rollers 30 and 31 positioned between the drum and spool, that portion of the tape between the two rollers being extended downwardly and then below a stud 32, the friction thus caused being such as to hold the tape taut as it is traveling from the drum to the spool.

The upper surface of the tape is preferably printed or divided into sections, each section representing a certain fraction of an hour or minute and the tape is so arranged that the fractional part of the hour will pass a pre-determined point at the time the hands of the clock mechanism indicate that particular time and by providing means for making an imprint upon the tape with the entrance of a child passenger into the vehicle, an imprint upon the tape with the exit of a child passenger from the vehicle, an imprint upon the tape with the entrance of an adult passenger into the vehicle, and an imprint with the exit of an adult passenger from the vehicle, the exact time of such entrance and exit will be recorded.

The impression is made on the top surface of the tape with the entrance and exit of adult passengers at a point immediately above the roller 30, only when plungers 14, and 36, are moved downwardly to their full moving space; said rollers forming a solid surface to receive the impact of the stamp or stencil 33 and 33ᴬ employed for making the impression, with the entrance of adult passengers in the vehicle on one-half of top surface of said tape and with the egress of adult passengers from the vehicle on the other half of the top surface of said tape; said stamp or stencil being secured to the free end of rods 34, and 37, the opposite end of said rods being pivotally attached to a shaft 35 and 35ᴬ, and by pivotally attaching the rods 34 and 37 in their length to the plungers 14 and 36, the lowering of said plungers downwardly to their full moving depth as will be done only when the weight of an adult passenger is placed upon plate 3 through the medium of spring 16. Plunger 14 to operate the ratchet 12, will likewise move the stamp 33 into engagement with the surface of the tape at a point immediately over the roller 30 and make an impression thereon. The tape 27 being moved to and fro by the operation of the rods 34 and 37 through a medium of ratchet 45, which employs a needle pivoted to a crank on said ratchet which carries tape 27 through the eye of the end of said needle, therefore causing the imprint upon the entrance and exit of adult passengers to be placed in rows across said tape.

In order to operate the registering mechanism upon the ingress of a child passenger into the vehicle, upon the ingress of an adult passenger into the vehicle, upon the egress of a child passenger from the vehicle, upon the egress of an adult passenger from the vehicle; a block 19 is slidably mounted upon plate 3 and immediately over the upper end of the plunger 14, said plunger normally resting thereagainst, the block being connected to plate 4 by means of cable 20, which cable extends around the sheave 21 adjacent to the rear edge of the step, and thence upwardly through an opening in step 2, where it is engaged with the under surface of step 4. The length of the cable 20 is such that when the forward edge of the plate 4 is elevated through medium of a spring 22, the block will be removed rearwardly so that the end of the plunger 14 will engage the block adjacent its forward edge, but when the plate 4 is depressed, the block 19 is moved forwardly through the medium of a spring 23, one end of which is secured to the plate 3 and the opposite end to the forward end of the block, and as the block moves, the end of the plunger 14 will enter an opening 24 in the block so that when the plate 3 is depressed the plunger 14 will remain stationary, and as the upper end of the plunger 36 extends a short distance above the upper surface of said step, it will be depressed to the surface of said step, which plunger is used as a medium to operate rod 37 to the free end of which is secured a stamp or stencil and employed to make an imprint upon the tape upon the egress of an adult passenger from the coach, and also said plunger is used as a medium to operate rod 38, the free end of which is secured to a stamp or stencil employed for making an imprint upon the lower surface of tape upon the egress of a child passenger from the vehicle. By this construction, it will be readily seen that as an adult passenger alights from the vehicle, plunger 36 is depressed downwardly a pre-determined distance and revolves a short space through the medium of a plate screw 40, where it is held by means of spring 43 until the notch therein is above rod 38, when it returns to its natural position, thus making an imprint upon the tape upon the exit of an adult passenger from the vehicle, while the remainder of the registering mechanism is held stationary. By this construction it will be seen that as a child passenger always steps upon the plate 4, previous to placing his weight on plate 3 when leaving the vehicle, the block 19 will be permitted to move forwardly in view of the slackening of the cable thus disposing the opening 24 immediately over the plunger 14 so that when the weight of the passenger is placed upon the plate 3, said plate will descend without operating the plunger 14 and depress plunger 36 downwardly about one-half its moving space according to the weight placed upon the plate 3 through medium of spring 16, and as a child passenger alights from plate 3 plunger 36 returns upwardly without having been revolved and the notch 41 in said plunger comes in contact with rod 38, which rod with a stamp or stencil secured to the free end thereof and employed to make an imprint upon the lower surface of said tape with the egress of a child passenger from the vehicle, while the remainder of the registering mechanism is held stationary. By this construction, it will be readily seen that an adult passenger when entering the vehicle always steps upon the plate 3 previous to placing his weight upon the plate 4, the plunger will engage the block adjacent its forward edge, and when his weight is placed upon plate 3, plunger 14 will be moved downwardly to its full moving space to operate the ratchet 12, will likewise move the stencil or stamp 33 into engagement with the upper surface of the tape at a point immediately over the roller 30 to make an impression thereon. By this construction it will also be readily seen that as a child passenger when entering the vehicle always steps upon the plate 3 previous to placing his weight upon the plate 4, the plunger 14 will engage the block adjacent its forward edge, and when his weight is placed upon plate 3, the plunger 14 will be moved downwardly according to the weight of the child through the medium of spring 16, which will not permit plunger 14 to be moved downward its full moving space until the weight of over 75 or 100 pounds (more or less) as conditions may require is placed upon plate 3 which, therefore, only moves plunger 36 downwardly about half its moving space and it does not in this event operate the ratchet 12, neither does it operate stencil 33, but does operate rod 38. In this manner it will be seen that the entrance of an adult passenger into the coach will be indicated on the register and the time of the entrance indicated upon the tape and the time of the egress of an adult passenger from the coach indicated upon the tape the time of the ingress of the child passenger into the coach indicated upon the tape and the time of the egress of the child passenger from the coach indicated upon the tape. The attendant will be required to account for a certain number of fares as shown by the indicator and register.

When the combined indicator and register is used it is placed in a suitable case 36, as is also the indicator, said case being removably secured below the step of a vehicle and provided with a door 37 which is secured in its closed position by any suitable form of lock so that no one except those having a key to the lock can gain access thereto.

In applying the device to use, the indicator when used alone is placed below the bottom step of the vehicle as shown, as is also the combined indicator and register and by starting the clock mechanism at the time of starting the vehicle on its trip, the clock mechanism being set to indicate the proper time, the tape will be gradually wound upon the spool 26 incident to the travel of the hands over the dial of the clock and said strip may be provided in lengths whereby they may be used for a number of hours or days, or may be shortened to last for a less number of hours as occasions may require.

As an example of the operation of the registering stamp, in connection with the tape, supposing that the time is 12.05 and a passenger enters the vehicle at this time, the lowering of the plate 3 to operate the register will also lower rod 34 and move the stamp or stencil into engagement with a surface of the tape 27 and as the division lines on said tape indicate the time of 12.05 is at a point immediately below the stamp, the attendant can immediately ascertain the time of entrance of each passenger also the time of the egress of each passenger as the other stencils will be operated on the same system.

It will be thus seen that I have provided a cheap and economical form of device for indicating and registering the entrance and departure of passengers from the vehicle and one that may be readily applied to use.

What I claim is:

1. In a device of the class described, the combination with a pair of steps, one in a plane above the other, of a registering mechanism below the lower step, a plunger extending upwardly through said lower step and adapted to operate the register when depressed, a plate hingedly secured above said lower step and adapted to extend over the end of said plunger, means to normally hold the plate in an elevated position, a similar plate hingedly secured to the upper step, means to normally hold said plate in an elevated position, a block carried by the lower plate and having an opening therethrough to receive the end of the plunger when the upper plate is depressed and means to connect said block to the upper plate whereby when said upper plate is elevated, the solid portion of the block will be disposed over the plunger.

2. In a device of the class described, the combination with a step of a vehicle: of a register below said step, a plunger adapted to operate said register, a hinged plate above said step adapted to operate said plunger when depressed and means to normally hold the free edge of the plate in elevated position.

3. A device of the class described comprising the combination with steps of a vehicle, of a plunger projecting upwardly through one of the steps, means carried by the last mentioned step to force the plunger in a downward direction, means for guiding the plunger and causing the same to rotate during its downward movement, a register beneath the step through which the plunger extends, and connections between the plunger and the register to operate the latter upon the downward movement of the plunger.

4. A device of the class described comprising the combination with a step of a vehicle, of a plunger projecting upwardly through the step, a second step, plates hinged above the steps, connections between the plates, means for resiliently holding the forward edges of the plates spaced above the steps, said plunger being normally held in an upward position, said plunger being adapted to be forced downwardly upon the application of pressure on the plate above the step through which the plunger extends, means for causing rotation of the plunger, arms adapted to be operated by the plunger during its downward movement, a register adapted to be operated by the arms, and means for returning the parts to their normal positions.

In testimony whereof I have signed my name to this specification in the presence of two subscribing witnesses.

ADOLPHUS D. BRANHAM.

Witnesses:
A. L. THOMAS,
S. J. KING.